(12) United States Patent
Stander (10) Patent No.: US 8,898,042 B2
(45) Date of Patent: Nov. 25, 2014

(54) MULTI-OBJECTIVE ENGINEERING DESIGN OPTIMIZATION USING SEQUENTIAL ADAPTIVE SAMPLING IN THE PARETO OPTIMAL REGION

(71) Applicant: Nielen Stander, Pleasanton, CA (US)

(72) Inventor: Nielen Stander, Pleasanton, CA (US)

(73) Assignee: Livermore Software Technology Corp., Livermore, CA (US)

( * ) Notice: Subject to any disclaimer, the term of this patent is extended or adjusted under 35 U.S.C. 154(b) by 333 days.

(21) Appl. No.: 13/626,162

(22) Filed: Sep. 25, 2012

(65) Prior Publication Data

US 2013/0185041 A1 Jul. 18, 2013

Related U.S. Application Data

(60) Provisional application No. 61/586,515, filed on Jan. 13, 2012.

(51) Int. Cl.
*G06F 7/60* (2006.01)
*G06F 17/10* (2006.01)
*G06G 7/48* (2006.01)
*G06F 17/11* (2006.01)
*G06N 7/00* (2006.01)

(52) U.S. Cl.
CPC ............ *G06F 17/11* (2013.01); *G06F 2217/08* (2013.01); *G06N 7/00* (2013.01)
USPC ...................... 703/2; 703/6; 703/8

(58) Field of Classification Search
CPC .............................. G06N 7/00; G06F 2217/08
USPC ......................................................... 703/2, 6, 8
See application file for complete search history.

(56) References Cited

U.S. PATENT DOCUMENTS

| | | | | |
|---|---|---|---|---|
| 7,363,280 | B2 * | 4/2008 | Jin et al. | 706/13 |
| 7,469,228 | B2 * | 12/2008 | Bonissone et al. | 705/36 R |
| 7,542,932 | B2 * | 6/2009 | Chalermkraivuth et al. | 705/35 |
| 7,593,834 | B2 * | 9/2009 | Levitan et al. | 703/2 |
| 7,630,928 | B2 * | 12/2009 | Bonissone et al. | 705/36 R |
| 8,126,795 | B2 * | 2/2012 | Bollapragada et al. | 705/36 R |
| 8,219,477 | B2 * | 7/2012 | Subbu et al. | 705/36 R |
| 8,271,921 | B2 * | 9/2012 | Nitta et al. | 716/110 |
| 8,315,843 | B2 * | 11/2012 | Anai et al. | 703/2 |
| 8,458,104 | B2 * | 6/2013 | Truemper | 706/12 |
| 8,577,815 | B2 * | 11/2013 | Barajas et al. | 706/13 |

* cited by examiner

*Primary Examiner* — Aniss Chad
(74) *Attorney, Agent, or Firm* — Roger H. Chu (57) ABSTRACT

Systems and methods of selecting sampling points (product designs) in a multi-objective engineering design optimization of a product are disclosed. The method comprises (a) receiving a description of the product to be optimized, (b) selecting an initial set of sampling points in a design variable space of the product, (c) obtaining numerically-simulated structural responses of each of the current set, (d) deriving a set of approximate POPs from optimization using metamodels constructed from numerically-simulated structural responses, (e) establishing subregions around POF kernels that are selected from approximate POPs using "Piercing" procedure, (f) creating a set of Diversity Basis Points by populating the subregions with a space filling criterion, (g) selecting another set of sampling points from a combined group of the Diversity Basis Points and POF kernels using "Piercing" procedure, (h) reducing the subregion size, and (i) repeating (c)-(h) until a termination condition has been reached.

12 Claims, 10 Drawing Sheets

MULTI-OBJECTIVE ENGINEERING DESIGN OPTIMIZATION USING SEQUENTIAL ADAPTIVE SAMPLING IN THE PARETO OPTIMAL REGION

FIELD

The present invention generally relates to engineering product design optimization, more particularly to selecting sampling points (i.e., alternative product designs) in a multi-objective engineering design optimization of a product (e.g., automobile) based on durability (e.g., crashworthiness) in response to an impact event (e.g., automobile collision).

BACKGROUND

Today, computer aided engineering (CAE) is used for supporting engineers in tasks such as analysis, simulation, design, manufacture, etc. In a conventional engineering design procedure, CAE analysis (e.g., finite element analysis (FEA), finite difference analysis, meshless analysis, computational fluid dynamics (CFD) analysis, modal analysis for reducing noise-vibration-harshness (NVH), etc.) has been employed to evaluate responses (e.g., stresses, displacements, etc.). Using automobile design as an example, a particular version or design of a car is analyzed using FEA to obtain the responses due to certain loading conditions. Engineers will then try to improve the car design by modifying certain parameters or design variables (e.g., thickness of the steel shell, locations of the frames, etc.) based on specific objectives and constraints. Another FEA is conducted to reflect these changes until a "best" design has been achieved. However, this approach generally depends on knowledge of the engineers or based on a trial-and-error method.

Furthermore, as often in any engineering problems or projects, these objectives and constraints are generally in conflict and interact with one another and design variables in nonlinear manners. Thus, it is not very clear how to modify them to achieve the "best" design or trade-off. This situation becomes even more complex in a multi-discipline optimization that requires several different CAE analyses (e.g., FEA, CFD and NVH) to meet a set of conflicting objectives. To solve this problem, a systematic approach to identify the "best" design, referred to as engineering design optimization, is used.

The optimization of such systems with more than one design objective functions is referred to as multi-objective engineering design optimization, which results in a set of optimal engineering designs that represent different trade-offs among design objectives. These optimal engineering designs are referred to as Pareto Optimal Points (POPs) in an N-dimensional design variable space, where N is the number of design variables of interest in the optimization.

One typical prior art approach of this engineering optimization procedure includes the following steps:

a. Select a suitable set of sampling points (i.e., alternative engineering designs) in the N-dimensional design variable space.
b. Conduct numerical simulations (e.g., FEA) of these sampling points in computer system to obtain numerically-simulated structural responses for each sampling point (i.e., each alternative design has a unique set of N design variables).
c. Use the numerically-simulated structural responses to construct approximations known as metamodels that can be used for predicting structural responses at any location within the N-dimensional design variable space.
d. Obtain a series of Pareto Optimal Points (i.e., product designs) or product designs $X^*=\{x_1, x_2, x_3, \ldots, x_Q\}$ by solving an approximate design optimization problem by minimizing the objective functions $\tilde{f}_i$; i=1, 2, 3, ..., n subject to the constraints $\tilde{g}_j(x)\leq 0$; j=1, 2, 3 ..., m, where $\tilde{f}_i(x)$ and $\tilde{g}_j(x)$ are based on the approximate functions or metamodels.

The purpose of using metamodels is three-fold: (1) The first is to reduce the number of simulations required to conduct the optimization as compared to using a direct multi-objective optimization method such as well known NSGA-II (Non-dominated Sorting Genetic Algorithm-II). Direct optimization algorithms typically use thousands of simulations to converge whereas a metamodel-based scheme may only require hundreds; (2) The second motivation for metamodel optimization is that the metamodel can be further adjusted after optimization. For instance, changes can be made to the design formulation followed by a rapid re-optimization as long as all the responses used to assemble the new formulation are available; and (3) A third reason is that reliability-based design optimization can only be conducted using metamodels since other methods (e.g., Monte Carlo simulations) are infeasible due to the requirement of multiple direct simulations.

The above approximate design optimization procedure can be modified by means of a Sequential Optimization Procedure for Multi-objective optimization. This is done by adding sample design points iteratively and constructing new metamodels based on the existing numerically-simulated structural responses (from previous iterations) as well as currently obtained numerically-simulated structural responses at the new sampling points.

One prior art approach for single objective optimization is therefore to construct a sequential method in which points are added in each iteration, progressively closer to the optimum designs. This improves the accuracy in the neighborhood of the solution while expending less effort in regions which are far away from the solution.

For Multi-objective optimization, one exemplary prior art approach is summarized in the following steps:
1. Select sampling points in the N-dimensional design variable space by spacing them as far as possible from each other and from previously selected points (in the first iteration there would be no previously simulated points, but in further iterations there would be an increasing number of previously simulated points).
2. Conduct computer or numerical simulations at selected sampling points.
3. Use the numerically-simulated structural responses to construct the metamodels.
4. Obtain approximate POPs as set X* by solving an approximate optimization problem constructed from these metamodels.
5. Select new sampling points using the neighborhood of the POPs as basis and use the new and existing sampling points to repeat the steps 2-4.

The problems for the above procedure exist, for example, at step 5, selecting new sampling points is conducted in the full N-dimensional design variable space. First, ad hoc procedures depended upon user experiences or knowledge are often required. Second, a number of unnecessary sampling points may be selected. When optimizing a design of an automobile based on crashworthiness, each computer simulation of a full car model (i.e., one sampling point having a unique combination of N design variables) requires tens of hours of a multi-processor computer system to perform. As a result, the above described procedure is too time and resource consuming thus impractical and infeasible, sometimes.

Furthermore, selected sampling points at each new iteration may not be diversified enough. As a result, the search for the Pareto Optimal Points may be conducted in the wrong location due to inaccurate approximations of the design criteria (i.e., sampling points not diversified enough). Diversification of the selected sampling points allows a wider early search with a gradually tightening Pareto Optimal Region to enhance convergence of the search. It would, therefore, be desirable to have a more effective and efficient procedure for selecting sampling points in a sequential multi-objective engineering design optimization of a product.

SUMMARY

This section is for the purpose of summarizing some aspects of the present invention and to briefly introduce some preferred embodiments. Simplifications or omissions in this section as well as in the abstract and the title herein may be made to avoid obscuring the purpose of the section. Such simplifications or omissions are not intended to limit the scope of the present invention.

To facilitate the description of the present invention, it deems necessary to provide definitions for some terms that will be used throughout the disclosure herein. It should be noted that the definitions following are to facilitate the understanding and describe the present invention according to an embodiment. The definitions may appear to include some limitations with respect to the embodiment, the actual meaning of the terms has applicability well beyond such embodiment, which can be appreciated by those skilled in the art.

Term "sampling point" used herein in this document is referred to as an product design in the N-dimensional design variable space having a unique set of N design variables.

Term "Pareto Optimal Point" represents an optimal product design as a result of multi-objective optimization.

Term "Space Filling" is referred to as a point selection method which maximizes the minimum distance between any two sampling points. The distance can be measured between a new (yet to be positioned) sampling point and a fixed point (where a simulation has already been conducted) or between two new points. The new points can be selected from a mixed discrete-continuous design space. A discrete-continuous design space means that some design variables can assume any value between their respective lower and upper bounds (continuous) while other design variables are selected from a set of specified values (discrete). New points may be limited to a subregion of the N-dimensional design variable space centered on the current solution.

Term "Piercing" is referred to as a point selection method which selects a specified number of points from a superset of defined (fixed) points by maximizing the minimum distance between the selected point and any other previously selected point from the superset or any other fixed point outside the superset (such as a previously simulated sampling point). The final set of points are therefore distant from each other and from any fixed points (if defined). Piercing is therefore also a space filling method, but is based on a fixed set of points.

Term "approximate POPs" is referred to those optimized product designs derived from metamodels, which are constructed from numerically-simulated structural responses of one or more sampling points. Each metamodel is related to design objectives and constraints. For example, the design objectives may include, but are not limited to, mass (weight) and strength of the product to be optimized. The constraint may be the maximum allowable intrusions during an impact. In other words, approximate POPs are obtained using multi-objective metamodel-based optimization.

Systems and methods of selecting sampling points in a sequential multi-objective engineering design optimization of a product (e.g., an automobile) based on durability (e.g., crashworthiness) in response to an impact event are disclosed.

In order to accelerate the optimization process, the sampling points of each iteration are typically chosen to be in the neighborhood of the current predicted POP set X*. Since the solution is uncertain during the first few iterations (due to the approximate nature of the metamodel), initially the sampling points for each step are typically chosen to be further away from the predicted POPs. However, with each iteration, they move closer to the predicted POPs. Creating new points in the neighborhood of the POPs is referred to as diversification.

According to one aspect, there are three basic steps in selection of POPs with diversification: (1) find a set of Pareto Optimal Frontier (POF) kernels that can be used as centers for diversification, (2) generate a larger basis set of diversification points and (3) pick a subset of Space Filling points from the basis set.

According to an exemplary embodiment of the present invention, the sampling points for each iteration are chosen from the POF neighborhood as follows:

Reduction: As approximated POPs can comprise thousands of points, reduce the current approximate POPs by using a Piercing approach to select a subset of Pareto Optimal Points (See FIG. 3). These points are designated as the POF kernels. Each POF kernel is surrounded with a corresponding subregion (See FIG. 4 and FIG. 5). To achieve a significant overlap between the kernel subregions, the desired number of POF kernels L is chosen to be equal to a (range factor)*(the number of wanted points for a specific iteration=M). The range factor $q^{(i)}$ is calculated as:

$$q^{(i)} = \frac{1}{r^{(i)}}$$

where $r^{(1)}$ is the current diversity range fraction for iteration i starting with $r^{(1)}=1.0$ in the first iteration. A range fraction $r^{(1)}=1.0$ implies that the subregion fills the entire design space with respect to all the design variables. After each iteration, the range is reduced by multiplying by a contraction rate $\lambda$ (e.g. $\lambda=0.7$) to find the range for the new iteration: $r^{(i)}=\lambda*r^{(i-1)}$. In other words, the subregions at each iteration are associated with a size. According to one embodiment of the present invention, the movement of the design with combined equally weighted objectives (which is also on the approximate POPs) is used together with the heuristics of the domain reduction approach. This method reduces the range of each variable individually.

Figure 4:
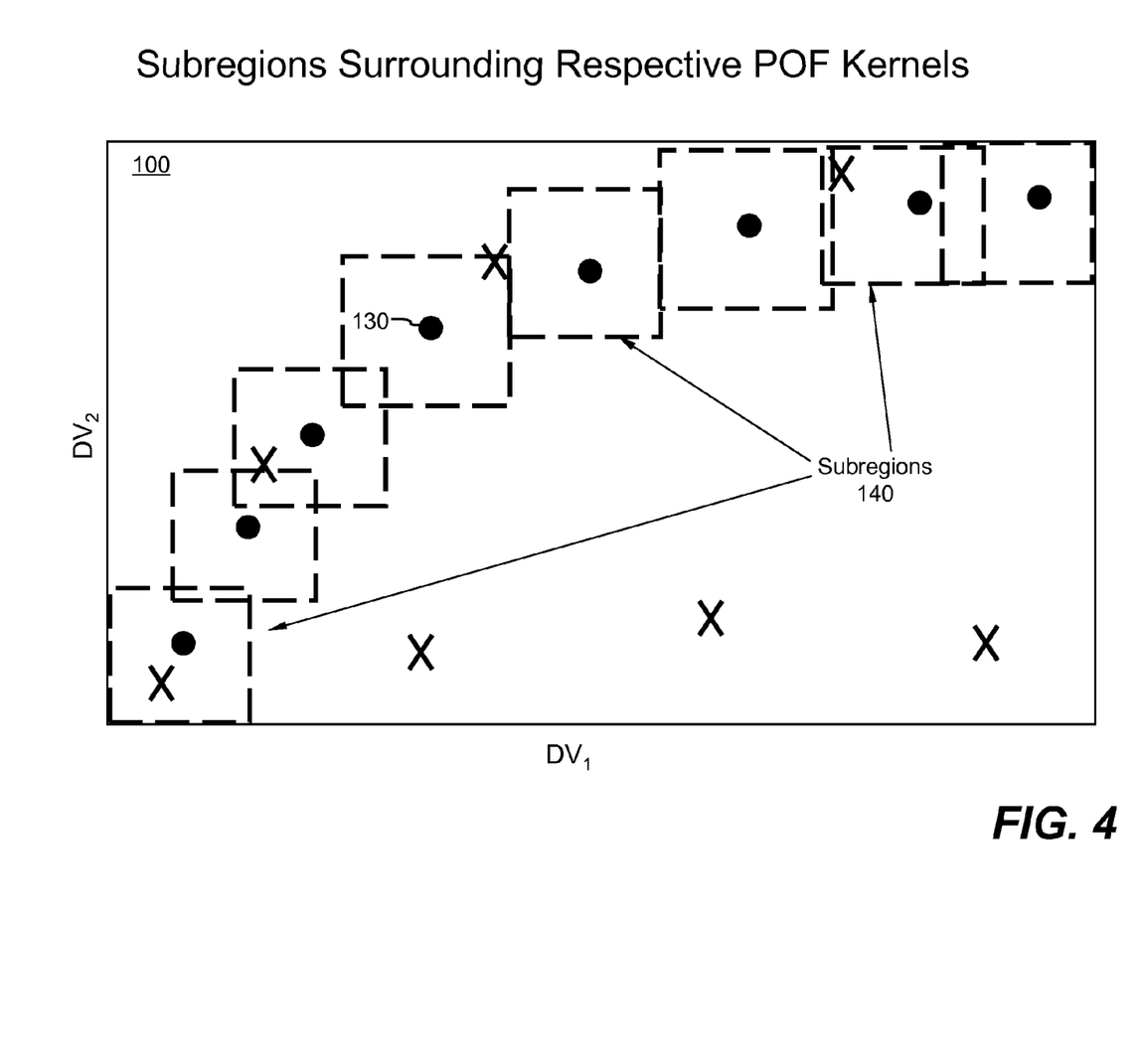
FIG. 4 is a diagram showing one or more exemplary subregions surrounding respective POF kernels (shown in black solid circles) in the exemplary design variable space of FIG. 1.

1. If the number of POF kernels desired for the reduced POF is larger than the number of available points in the full POPs, all the available points are taken. In certain circumstances, there could even be a single point in the initial set of POPs.
2. Diversification: Diversify the POPs by adding M points around each POF kernel (FIG. 4). The points are Space Filling and are added within a subregion centered on each POF kernel, i.e. they maximize the distance between themselves and all other sampling points and all other diversified points chosen thus far as we move from one POF kernel to the next. The size of the subregion for each variable j is $r^{(i)}*(U_j-L_j)$. Uj and Lj represent the respective upper and lower bounds of the design space and $r^{(i)}$ represents the range fraction for iteration (i). Including the POF kernels, there are now altogether L*M basis points in the L subregions. The choice of range factor $q^{(i)}$ together with the overlap factor ensures sufficient overlap between subregions.

3. Discrete Space Filling: Use a Space Filling approach by picking a subset of M points from the full diversified set of L*M basis points which maximizes the minimum distance between each other and all points which have already been simulated (from previous iterations). (See FIG. 6).

According to one aspect, the present invention is not sensitive to how $r^{(i)}$ is chosen as long as there is a size reduction of the subregions with each iteration so that the diversified basis points move ever closer to the POF kernels. It should also be noted that the contraction rate λ does not have to be a constant, but can also be determined in other ways which do not necessarily alter the essence of the diversification method or the effectiveness of the invention described herein. For instance the contraction rate can be determined from the iterative movement of a single optimal design (such as for instance computed by combining the multiple objectives of the multi-objective optimization problem into a single objective).

The resulting point set of M points is the experimental design (sampled set) for the next iteration. See FIG. 7. Repeat the process until a terminal criterion is reached (e.g., max. number of iterations, size of subregion has reduced to a predetermined minimum size, etc.).

Objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be better understood with regard to the following description, appended claims, and accompanying drawings as follows:

DETAILED DESCRIPTION

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures, components have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1-10. However, those skilled in the art will readily appreciate that the detailed description given herein with respect to these figures is for explanatory purposes as the invention extends beyond these limited embodiments.

Figure 1:
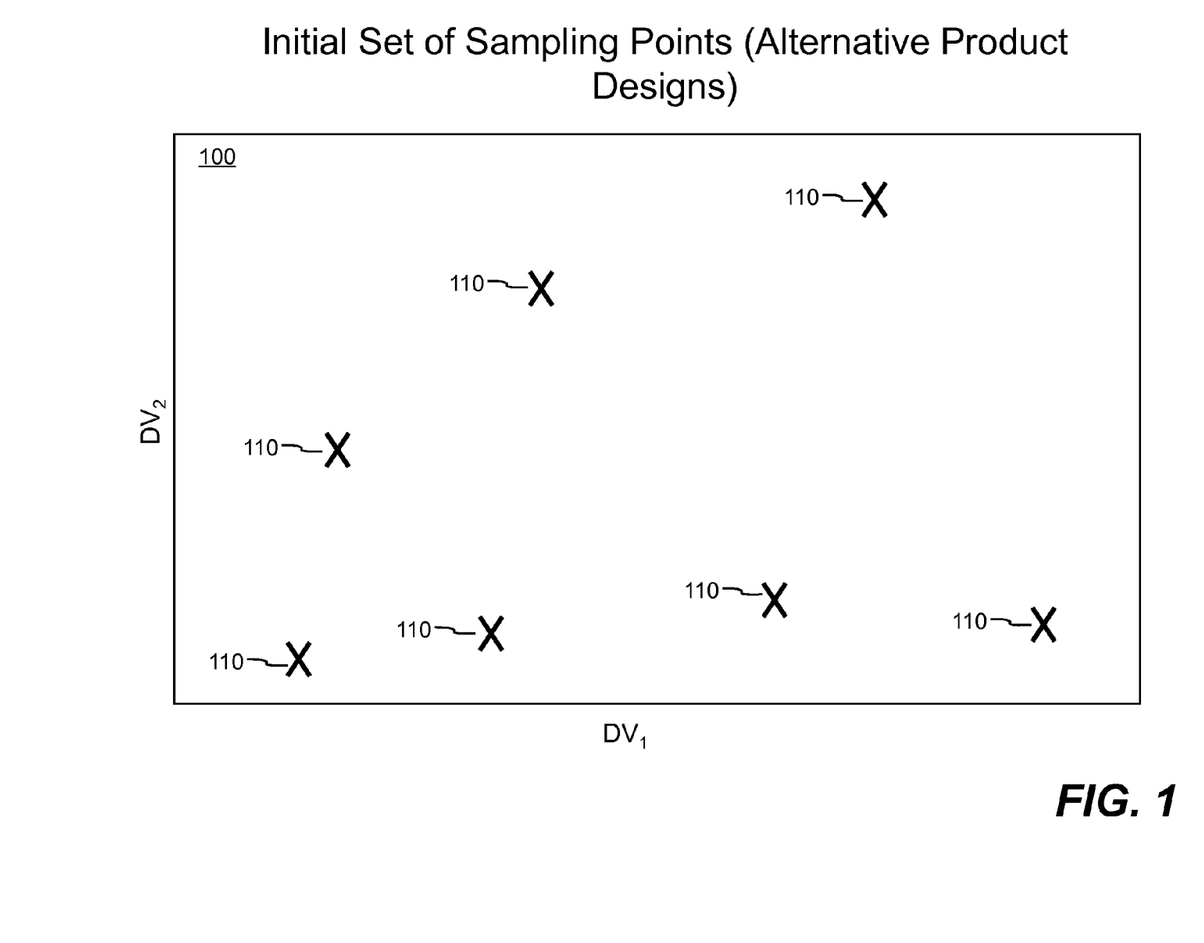
FIG. 1 is a diagram showing an initial set of exemplary sampling points (i.e., engineering designs) in the beginning (initial iteration) of a multi-objective engineering design optimization in an exemplary two-dimensional design variable space, according to an embodiment of the present invention.

Referring first of FIG. 1, it is shown a number of exemplary sampling points 110 (i.e., engineering designs of an automobile) in the beginning (initial iteration 1) of a multi-objective engineering design optimization of a product (e.g., an automobile) in an exemplary two-dimensional design variable space 100, according to an embodiment of the present invention. The two-dimensional design variable space 100 comprises two design variables $DV_1$ and $DV_2$, each represent one of the two dimensions, for example, size of bumper, location of firewall, airbag, etc. One exemplary optimization is to optimize the durability of an automobile in an impact event shown in FIG. 8.

Figure 2:
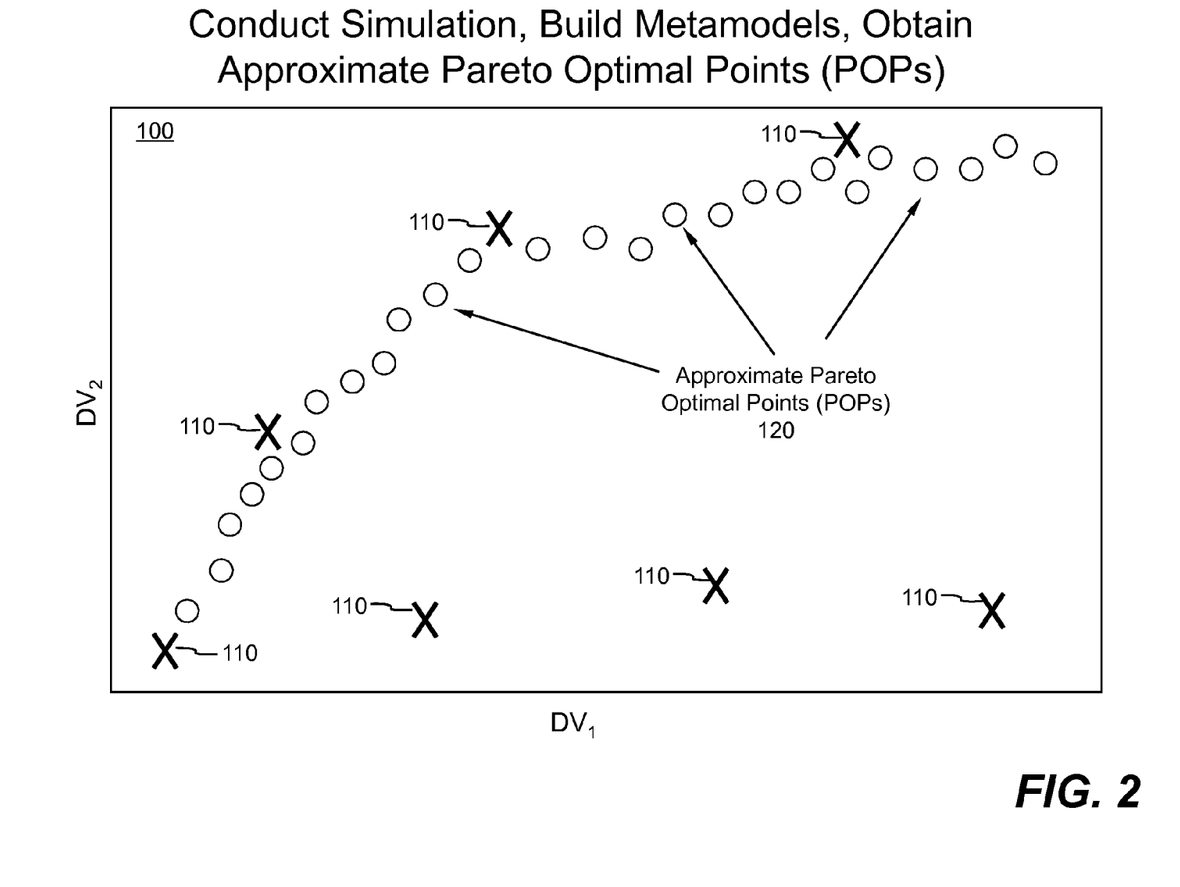
FIG. 2 is a diagram showing the currently-selected set of sampling points (i.e., engineering designs) along with a number of approximate Pareto Optimal Points (POPs) derived from metamodels in the design variable space of FIG. 1.

FIG. 2 shows the initial set of sampling points 110 (i.e., engineering designs) along with a number of approximate Pareto Optimal Points 120 (POPs) derived from metamodels of a multi-objective engineering design optimization in the exemplary design variable space 100 of FIG. 1. Approximate POPs are obtained through metamodels, which are created using numerically-simulated structural responses of the currently-selected sampling points. The numerically-simulated structural responses are obtained by conducting time-marching simulations (i.e., computer simulation using finite element analysis). Metamodels are mathematical equation used for predicting the structural responses of the entire design variable space.

Figure 3:
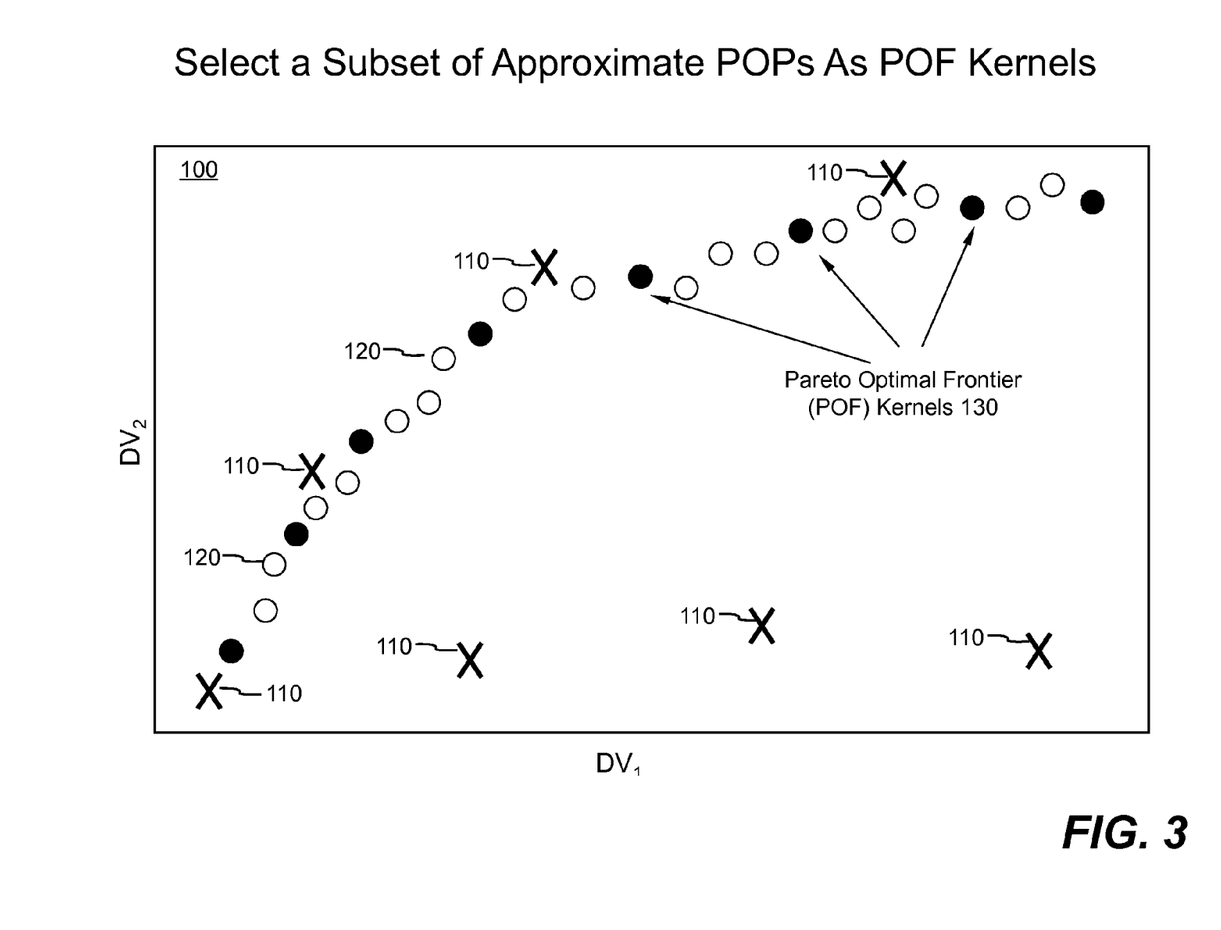
FIG. 3 is a diagram showing the currently-selected set of sampling points (i.e., engineering designs) along with POF kernels (shown in solid black circles) in the design variable space of FIG. 1.

FIG. 3 shows the currently-selected set of sampling points (i.e., engineering designs) 110 along with a set of Pareto Optimal Frontier (POF) kernels 130 (depicted in solid circular dots) in the exemplary design variable space 100 of FIG. 1. POF kernels are selected from the group containing the currently-selected set of sampling points 110 (denoted with "x") and the set of POPs 120 (denoted with "o") using a point selection procedure that maximizes minimum distance amongst selected POF kernels 130 (i.e., the "Piercing" procedure). It is evident that POF kernels 130 are a subset of the currently-selected set of sampling points 110 and the metamodel derived POPs 120.

In order to correctly find the optimized designs in a multi-objective engineering design optimization, selecting a diversified set of sampling points is important. According to one embodiment, to diversify the selection, the present invention establishes one or more subregions surrounding respective POF kernels. Shown in FIG. 4 is an example of one or more subregions 140 (shown as dotted line square) with respective POF kernels 130 in the exemplary design variable space 100 of FIG. 1. Subregions 140 are associated with a size. Initially, the size of subregion 140 can be the same as that of the design variable space. The size of the subregion 140 is reduced at each iteration of the optimization procedure. In one embodiment, the termination condition of the optimization is dependent upon the size of subregion 140.

Figure 5:
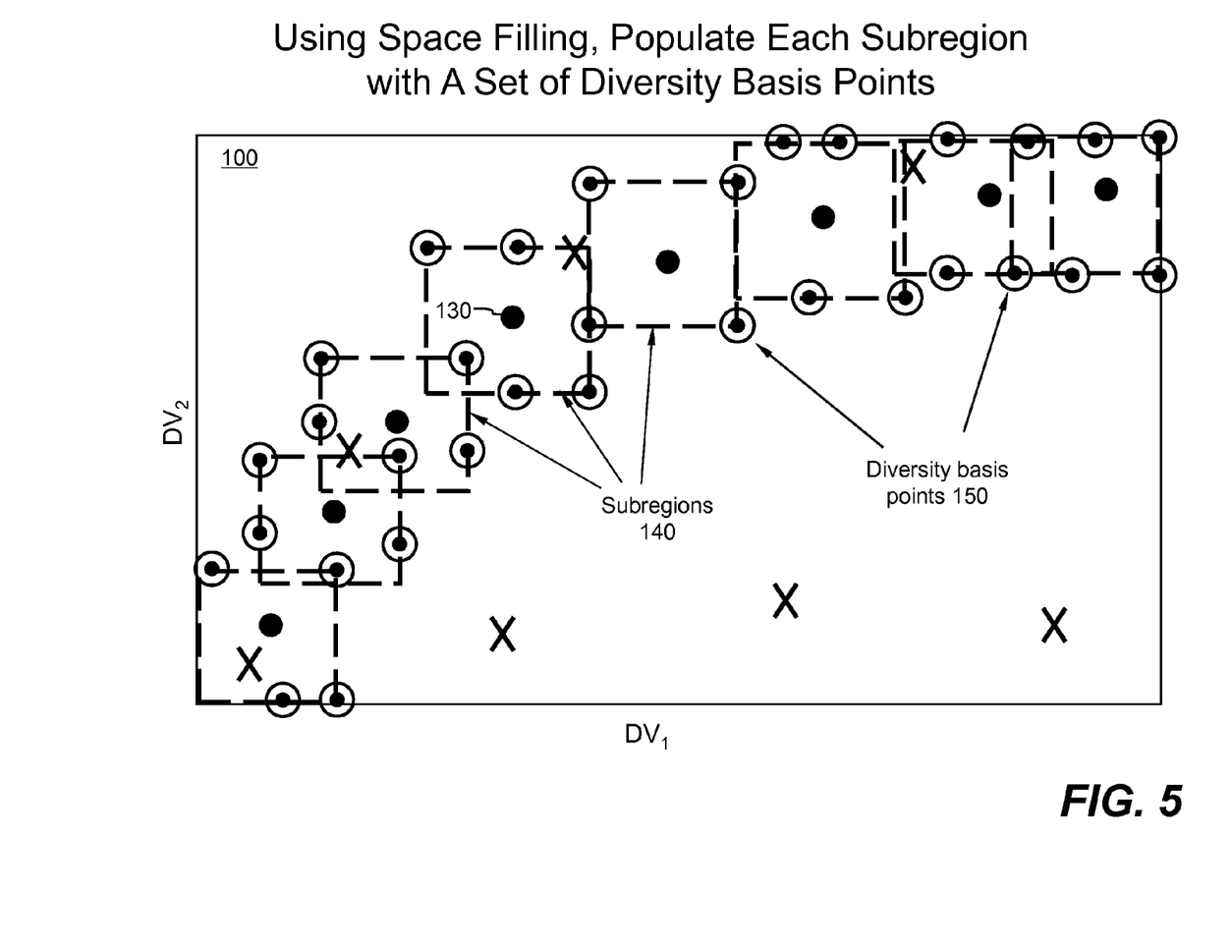
FIG. 5 is a diagram showing each subregion populated with a specific number of Diversity Basis Points. Each Diversity Basis Point is depicted by a circumpunct. The Diversity Basis Points are computed to be distant from each other and from all previously simulated designs. The original POF kernels (solid circles) are included in the Diversity Basis Points.

After the subregions 140 have been established, a set of Diversity Basis Points within each subregion is created using a space filling procedure. FIG. 5 shows an exemplary set of Diversity Basis Points 150 in the design variable space 100 of FIG. 1. Each Diversity Basis Point 150 is depicted by a circumpunct. The Diversity Basis Points 150 are computed to be distant from each other and from all previously simulated sampling points. The POF kernels 130 (solid circular dots) are included in the Diversity Basis Points 150.

Figure 6:
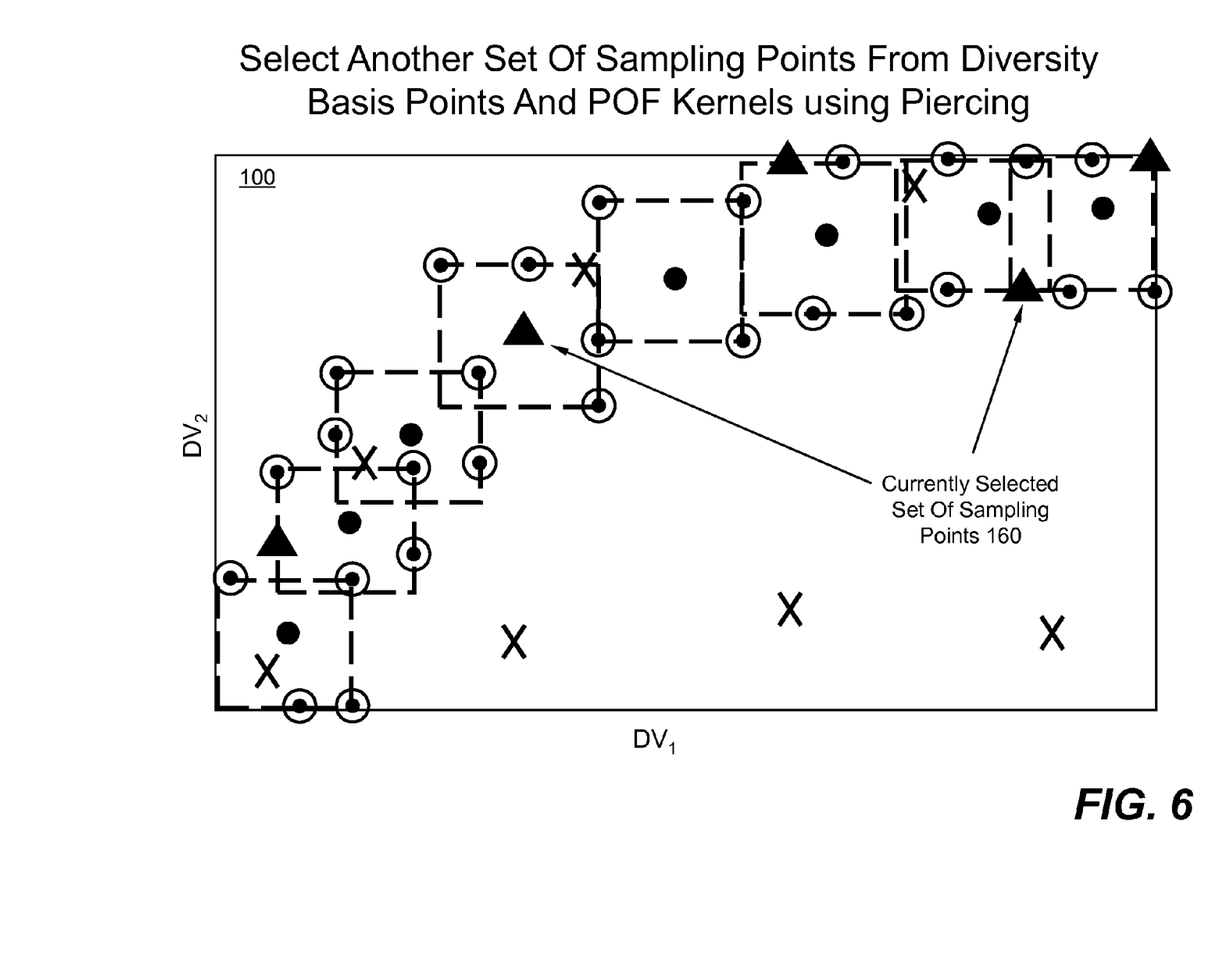
FIG. 6 is a diagram showing an exemplary set of Diversity Sampling Points (solid triangles) selected from a plurality of Diversity Basis Points (circumpunct) surrounding respective POF kernels in the exemplary design variable space of FIG. 1. The Diversity Sampling Points are shown as solid triangles. The Diversity Sampling points are chosen from the Diversity Basis Points using a Piercing method.

From the set of Diversity Basis Points 150 and the POF kernels 130, another set of sampling points 160 is selected using the Piercing point selection method. FIG. 6 shows such example in the exemplary design variable space 100 of FIG. 1. As a result, the currently-selected set of sampling points 160 (shown in triangles) are diversified.

Figure 7:
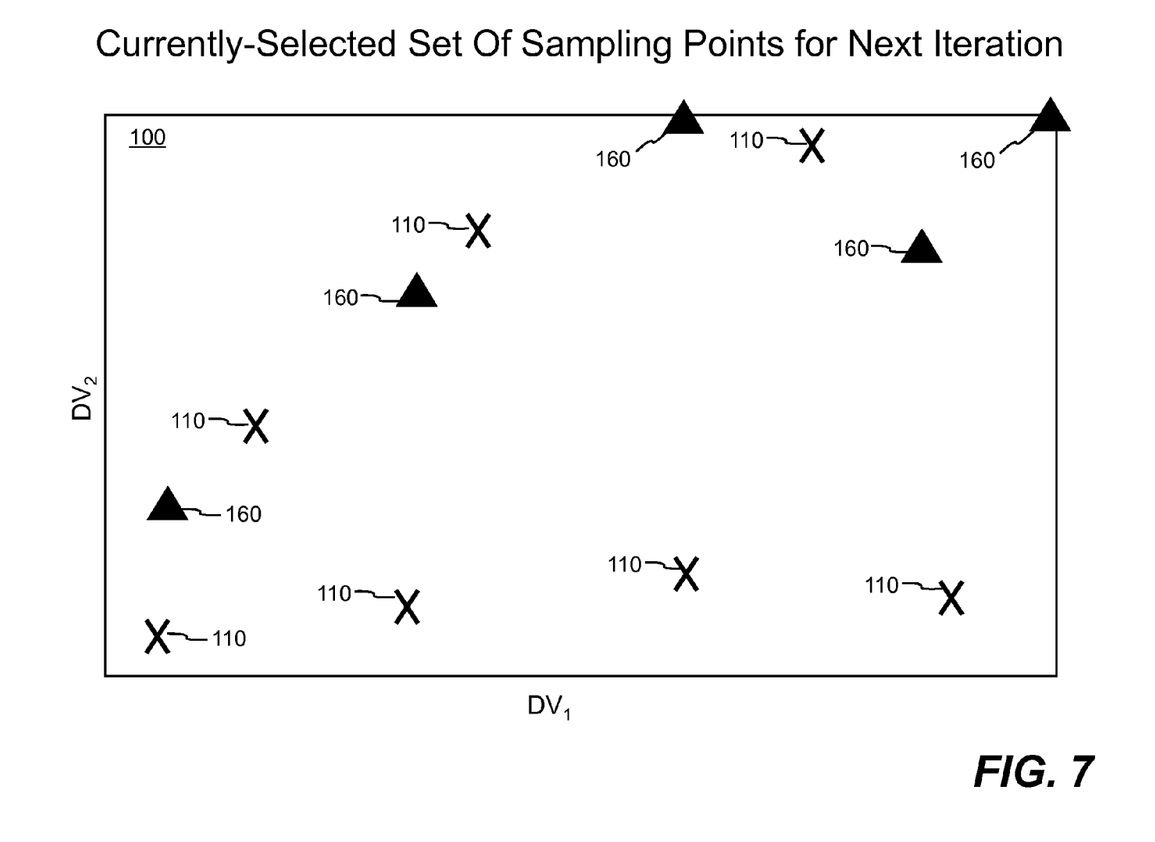
FIG. 7 is a diagram showing an optionally-merged currently-selected exemplary set of sampling points for the next iteration in the exemplary design variable space of FIG. 1.

FIG. 7 shows an optionally merged exemplary currently-selected set of sampling points in the design variable space 100 of FIG. 1.

Figure 8:
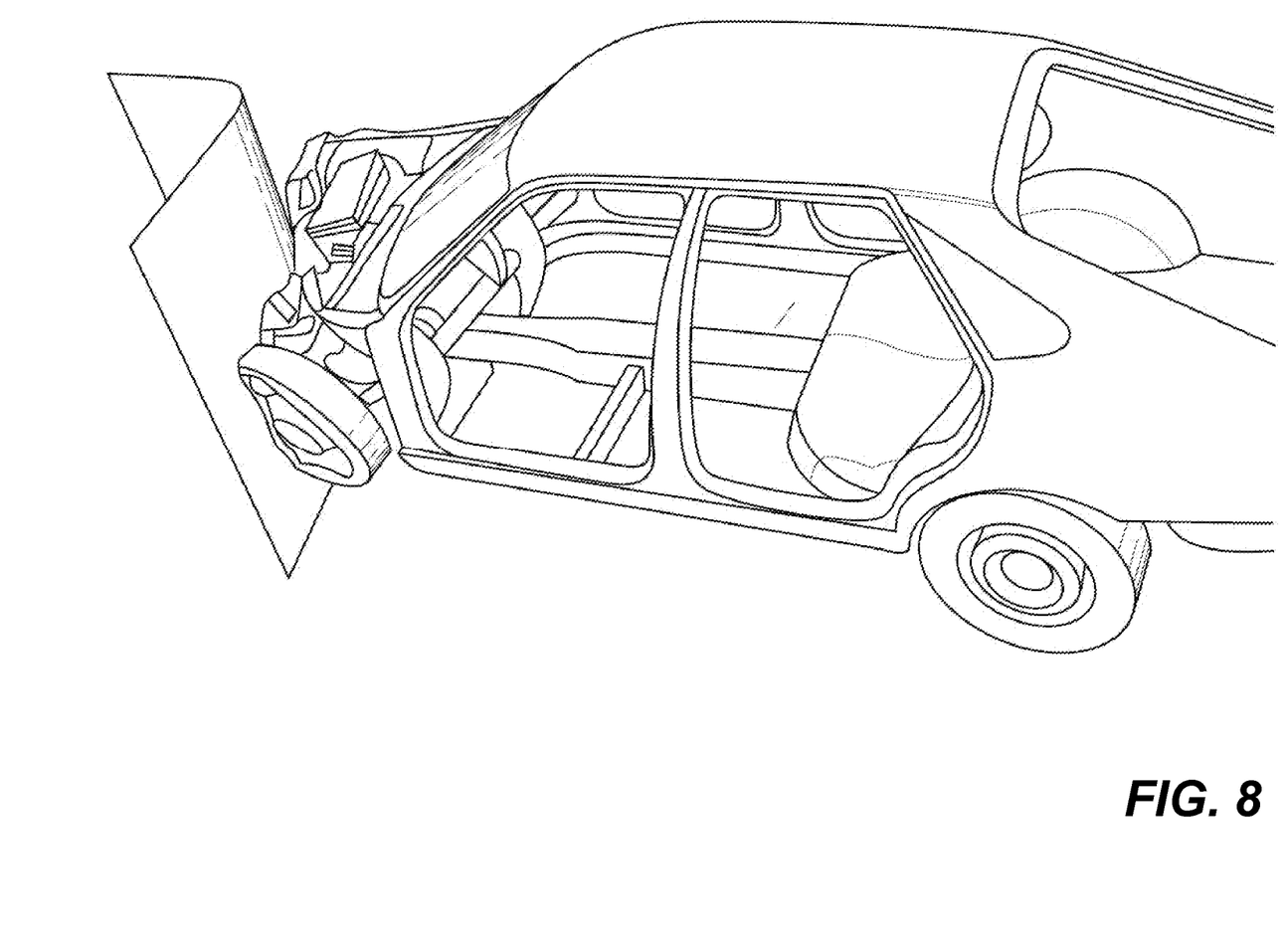
FIG. 8 is a diagram showing an exemplary numerical or computer simulation results (i.e., numerically-simulated structural responses) of an automobile collision, according to one embodiment of the present invention.

FIG. 8 is a diagram showing an exemplary time-marching simulation result (numerical-simulated structural responses) of a car crash using explicit finite element analysis, according to one embodiment of the present invention.

Figure 9:
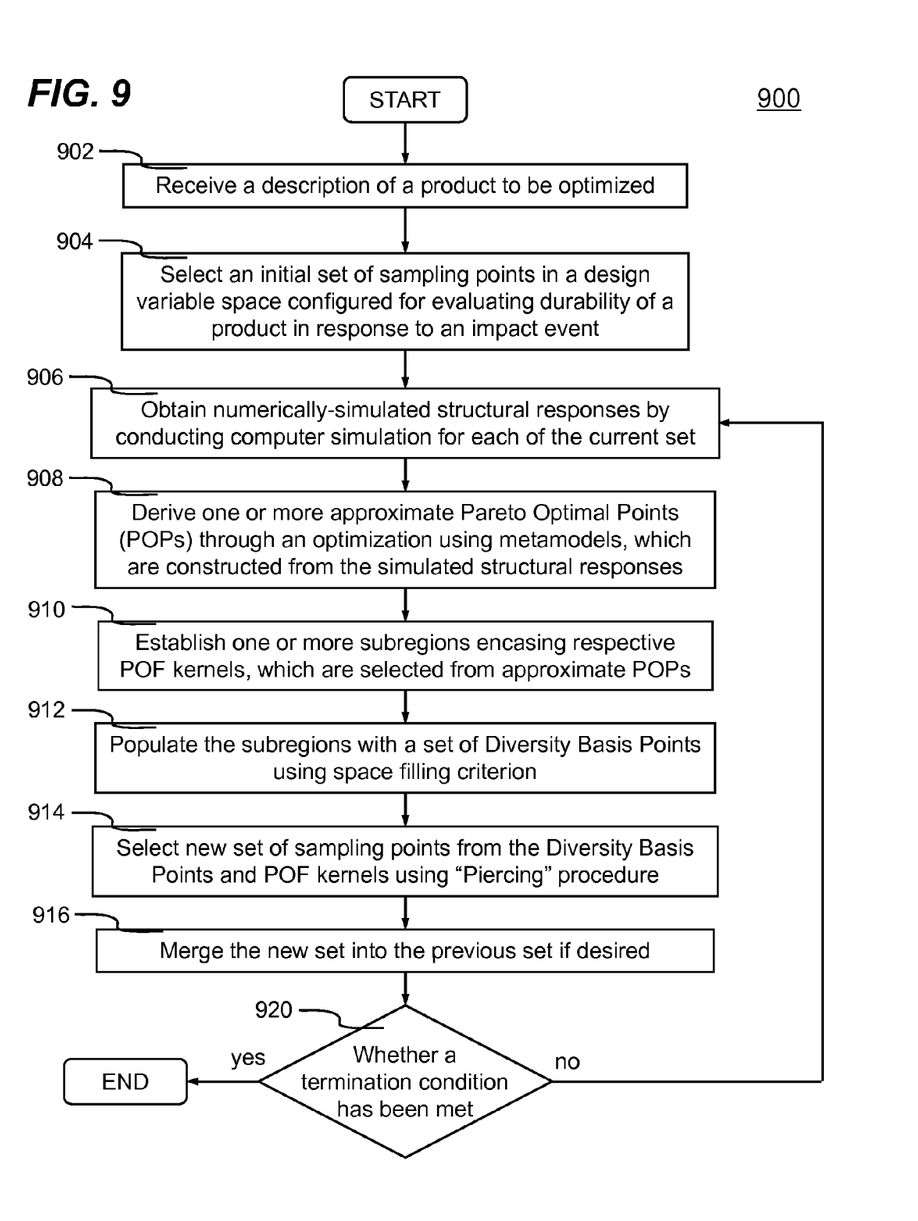
FIG. 9 is a flowchart illustrating an exemplary process of selecting sampling product designs in a multi-objective engineering design optimization of a product based on durability in response to an impact event, according to an embodiment of the present invention.

FIG. 9 is a flowchart illustrating an exemplary process 900 of selecting sampling points (i.e., product designs) in a multi-objective engineering design optimization of a product based on its durability in response to an impact event, according to an embodiment of the present invention. Process 900 is implemented in software and preferably understood with other figures.

Process 900 starts by receiving a description of a product (e.g., a car) to be optimized at step 902. The description includes design objectives and constraints to be used in the multi-objective engineering design optimization. Examples of the objectives may include, but not limited to, mass, strength. Exemplary constraints may include amount of intrusion allowed in the impact event. At step 904, an initial set of sampling points (i.e., alternative product designs) are selected in a design variable space. (See FIG. 1) For example, the design variable space is configured for evaluating durability of the product in an impact event (e.g., a car in an offset collision with a barrier shown in FIG. 8). The design variable space can have N dimensions with each dimension corresponding to a design variable (e.g., thickness of bumper). The exemplary design variable space shown in this document is two-dimensional for illustration simplicity. It is noted that N-dimensional design variable space (i.e., a hypercube) cannot be easily displayed in a two-dimension figure. Selection of the first set of sampling points can be done with various well-known experimental design procedures (e.g., Full Factorial, D-Optimal, Space Filling, etc.).

Next, numerically-simulated structural responses of each of the currently-selected set of sampling points are obtained with a time-marching simulation (e.g., using finite element analysis) of the impact event using the corresponding FEA model at step 906. It is noted that each time-marching simulation generally takes a long time to conduct (e.g., an overnight computer run). Using the numerically-simulated structural responses, one or more metamodels are created at step 908. And, one or more approximate Pareto Optimal Points (POPs) are obtained through multi-objective optimization using metamodels. Metamodels are mathematical equations created using a regression analysis of the sampling points and their corresponding results and may include, but are not limited to, Response Surfaces, Radial Basis Functions, Neural Networks, Support Vector Regression, etc. (See FIG. 2)

Next at step 910, a subset of approximate POPs (referred to as POF kernels) comprising one or more approximate POPs is created. A "Piercing" method is used to select the POF kernels from approximate POPs so that the POF kernels are distant from one another. (See FIG. 3)

Then, one or more subregions are created to envelop respective POF kernels. (See FIG. 5) In general, when there is more than one subregion established, these subregions are overlapped at the boundary. It is noted that subregions can be relatively large in the early iterations so that there is a significant overlap. The dimensions of the subregions are the same for a particular iteration, but are reduced from a current iteration to the next using a contraction rate factor. One exemplary reduction is 70% of the previous one. In the first iteration, the subregion fills the entire design space with respect to all the variables.

Next, at step 912, a set of Diversity Basis Points is creating by populating a fixed number of points within each subregion using a Space Filling criterion, which entails selecting the points to be distant from one another as well as from the sampling points of previous iterations.

Next, at Step 914, a new set of sampling points (diversified set) are selected from a combined group of the Diversity Basis Points and POF kernels using the "Piercing" method so that the distance between the new set of sampling points amongst one another and with respect to sampling points of previous iterations is maximized. (See FIG. 6)

At step 916, Diversity Sampling points are optionally merged into the existing sampling points from previous iterations. (See FIG. 7)

Decision 920 determines whether a termination condition has been reached (e.g., has multi-objective design optimization reached predefined number of iterations?). If 'no', the subregion size is reduced, and process 900 moves back to step 906 to repeat the previous steps until decision 920 becomes true and process 900 ends. The termination condition is established with well known methods, for example, maximum number of iterations, minimum size of the subregions, etc. At the end of process 900, the new or currently-selected set of sampling points represent the optimized designs of the multi-objective engineering design optimization.

Figure 10:
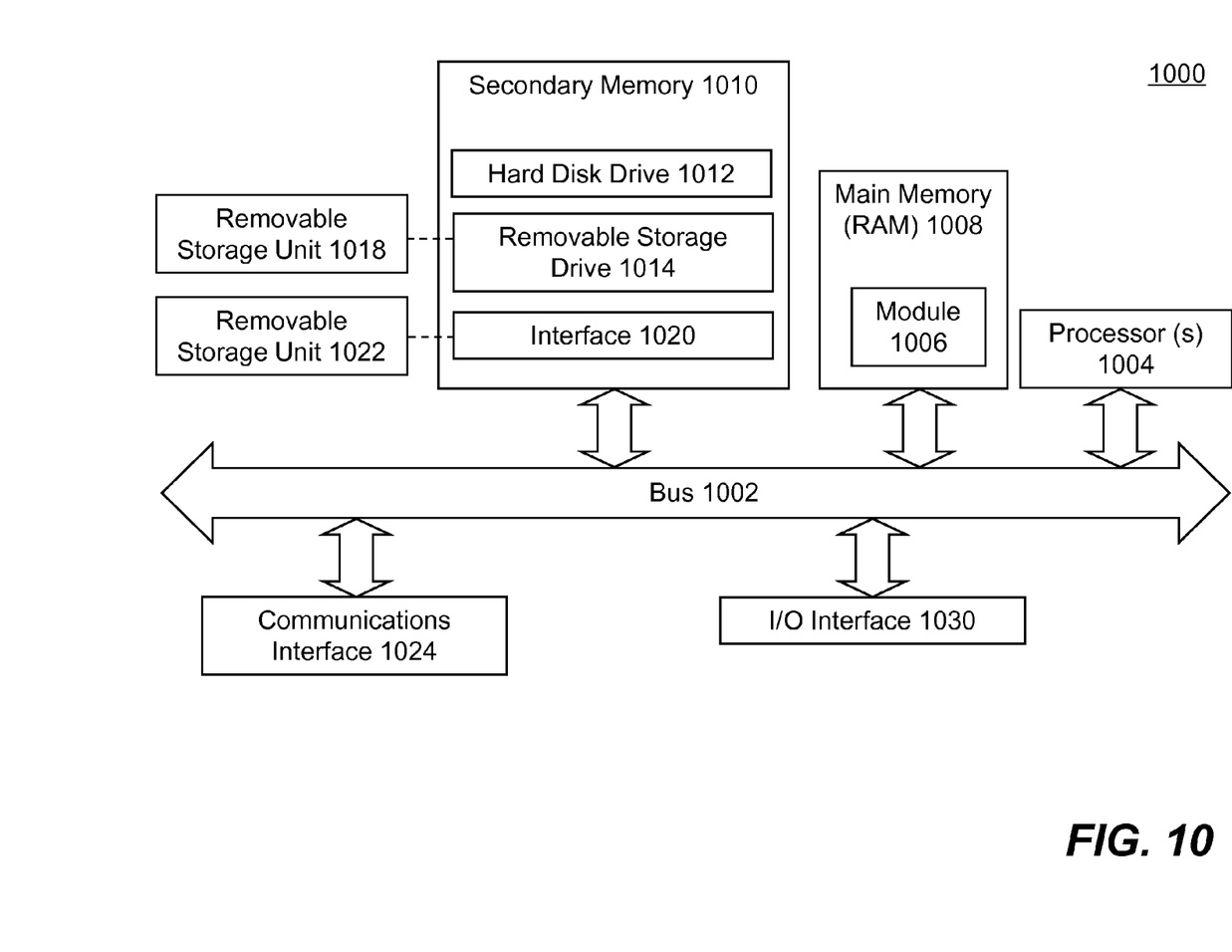
FIG. 10 is a function diagram showing salient components of a computing device, in which an embodiment of the present invention may be implemented.

According to one aspect, the present invention is directed towards one or more computer systems capable of carrying out the functionality described herein. An example of a computer system 1000 is shown in FIG. 10. The computer system 1000 includes one or more processors, such as processor 1004. The processor 1004 is connected to a computer system internal communication bus 1002. Various software embodiments are described in terms of this exemplary computer system. After reading this description, it will become apparent to a person skilled in the relevant art(s) how to implement the invention using other computer systems and/or computer architectures.

Computer system 1000 also includes a main memory 1008, preferably random access memory (RAM), and may also include a secondary memory 1010. The secondary memory 1010 may include, for example, one or more hard disk drives 1012 and/or one or more removable storage drives 1014, representing a floppy disk drive, a magnetic tape drive, an optical disk drive, etc. The removable storage drive 1014 reads from and/or writes to a removable storage unit 1018 in a well-known manner. Removable storage unit 1018, represents a floppy disk, magnetic tape, optical disk, etc. which is read by and written to by removable storage drive 1014. As will be appreciated, the removable storage unit 1018 includes a computer usable storage medium having stored therein computer software and/or data.

In alternative embodiments, secondary memory 1010 may include other similar means for allowing computer programs or other instructions to be loaded into computer system 1000. Such means may include, for example, a removable storage unit 1022 and an interface 1020. Examples of such may include a program cartridge and cartridge interface (such as that found in video game devices), a removable memory chip (such as an Erasable Programmable Read-Only Memory (EPROM), Universal Serial Bus (USB) flash memory, or PROM) and associated socket, and other removable storage units 1022 and interfaces 1020 which allow software and data to be transferred from the removable storage unit 1022 to computer system 1000. In general, Computer system 1000 is controlled and coordinated by operating system (OS) software, which performs tasks such as process scheduling, memory management, networking and I/O services.

There may also be a communications interface 1024 connecting to the bus 1002. Communications interface 1024 allows software and data to be transferred between computer system 1000 and external devices. Examples of communications interface 1024 may include a modem, a network interface (such as an Ethernet card), a communications port, a Personal Computer Memory Card International Association (PCMCIA) slot and card, etc. Software and data transferred via communications interface 1024. The computer 1000 communicates with other computing devices over a data network based on a special set of rules (i.e., a protocol). One of the common protocols is TCP/IP (Transmission Control Protocol/Internet Protocol) commonly used in the Internet. In general, the communication interface 1024 manages the assembling of a data file into smaller packets that are transmitted over the data network or reassembles received packets into the original data file. In addition, the communication interface 1024 handles the address part of each packet so that it gets to the right destination or intercepts packets destined for the computer 1000. In this document, the terms "computer program medium", "computer readable medium", "computer recordable medium" and "computer usable medium" are used to generally refer to media such as removable storage drive 1014 (e.g., flash storage drive), and/or a hard disk installed in hard disk drive 1012. These computer program products are means for providing software to computer system 1000. The invention is directed to such computer program products.

The computer system 1000 may also include an input/output (I/O) interface 1030, which provides the computer system 1000 to access monitor, keyboard, mouse, printer, scanner, plotter, and alike.

Computer programs (also called computer control logic) are stored as application modules 1006 in main memory 1008 and/or secondary memory 1010. Computer programs may also be received via communications interface 1024. Such computer programs, when executed, enable the computer system 1000 to perform the features of the present invention as discussed herein. In particular, the computer programs, when executed, enable the processor 1004 to perform features of the present invention. Accordingly, such computer programs represent controllers of the computer system 1000.

In an embodiment where the invention is implemented using software, the software may be stored in a computer program product and loaded into computer system 1000 using removable storage drive 1014, hard drive 1012, or communications interface 1024. The application module 1006, when executed by the processor 1004, causes the processor 1004 to perform the functions of the invention as described herein.

The main memory 1008 may be loaded with one or more application modules 1006 that can be executed by one or more processors 1004 with or without a user input through the I/O interface 1030 to achieve desired tasks. In operation, when at least one processor 1004 executes one of the application modules 1006, the results are computed and stored in the secondary memory 1010 (i.e., hard disk drive 1012). The status of the CAE analysis or engineering design optimization (e.g., Pareto Optimal Points) is reported to the user via the I/O interface 1030 either in a text or in a graphical representation.

Although the present invention has been described with reference to specific embodiments thereof, these embodiments are merely illustrative, and not restrictive of, the present invention. Various modifications or changes to the specifically disclosed exemplary embodiments will be suggested to persons skilled in the art. For example, whereas numbers of design objective functions have been described and shown as two (two-dimensional design variable space shown in FIGS. 1-7), in reality, larger numbers of design objectives can be used. In summary, the scope of the invention should not be restricted to the specific exemplary embodiments disclosed herein, and all modifications that are readily suggested to those of ordinary skill in the art should be included within the spirit and purview of this application and scope of the appended claims.

I claim:

1. A method of selecting sampling points in a sequential multi-objective engineering design optimization of a product based on the product's durability in response to an impact event, said method comprising:
   (a) receiving a description of the product to be optimized;
   (b) selecting an initial set of sampling points in a design variable space configured for evaluating durability of the product in response to an impact event;

(c) obtaining numerically-simulated structural responses by conducting a computer simulation of the impact event for each of the currently-selected set of the sampling points;

(d) constructing metamodels using the numerically-simulated structural responses and deriving one or more approximate Pareto Optimal Points (POPs) from said metamodels;

(e) selecting one or more Pareto Optimal Frontier (POF) kernels from said one or more approximate POPs with a first point selection procedure that maximizes minimum distance amongst the selected POF kernels;

(f) establishing one or more subregions encasing the respective POF kernels, each subregion being associated with a size;

(g) creating a set of Diversity Basis Points by populating said subregions according to a space filling criterion;

(h) selecting another set of sampling points from a combined group of the set of Diversity Basis Points and the POF kernels using a second point selection procedure that maximizes minimum distance amongst the currently-selected set of sampling points; and (i) reducing the size of said subregions and repeating (c)-(h), until a termination condition has been reached and the currently-selected set of sampling points represent optimal designs of the product.

2. The method of claim 1, wherein the product comprises an automobile.

3. The method of claim 2, wherein said durability in response to the impact event comprises crashworthiness of the automobile.

4. The method of claim 1, wherein said computer simulation comprises a time-marching simulation using explicit finite element analysis.

5. The method of claim 1, wherein said termination condition comprises a maximum number of iterations.

6. The method of claim 1, wherein said termination condition comprises a minimum size of the subregions.

7. The method of claim 1, further comprises merging the currently-selected set of sampling points into the previous set of sampling points.

8. The method of claim 1, wherein said one or more subregions are overlapped at respective borders.

9. A system for selecting sampling points in a sequential multi-objective engineering design optimization of a product based on the product's durability in response to an impact event, said system comprising:

a main memory for storing computer readable code for an application module;

at least one processor coupled to the main memory, said at least one processor executing the computer readable code in the main memory to cause the application module to perform operations by a method of:

(a) receiving a description of the product to be optimized;

(b) selecting an initial set of sampling points in a design variable space configured for evaluating durability of the product in response to an impact event;

(c) obtaining numerically-simulated structural responses by conducting a computer simulation of the impact event for each of the currently-selected set of the sampling points;

(d) constructing metamodels using the numerically-simulated structural responses and deriving one or more approximate Pareto Optimal Points (POPs) from said metamodels;

(e) selecting one or more Pareto Optimal Frontier (POF) kernels from said one or more approximate POPs with a first point selection procedure that maximizes minimum distance amongst the selected POF kernels;

(f) establishing one or more subregions encasing the respective POF kernels, each subregion being associated with a size;

(g) creating a set of Diversity Basis Points by populating said subregions according to a space filling criterion;

(h) selecting another set of sampling points from a combined group of the set of Diversity Basis Points and the POF kernels using a second point selection procedure that maximizes minimum distance amongst the currently-selected set of sampling points; and (i) reducing the size of said subregions and repeating (c)-(h), until a termination condition has been reached and the currently-selected set of sampling points represent optimal designs of the product.

10. The system of claim 9, wherein said one or more subregions are overlapped at respective borders.

11. A non-transitory computer readable storage medium containing instructions, when executed in a computer system, for selecting sampling points in a sequential multi-objective engineering design optimization of a product based on the product's durability in response to an impact event by a method comprising:

(a) receiving a description of the product to be optimized;

(b) selecting an initial set of sampling points in a design variable space configured for evaluating durability of the product in response to an impact event;

(c) obtaining numerically-simulated structural responses by conducting a computer simulation of the impact event for each of the currently-selected set of the sampling points;

(d) constructing metamodels using the numerically-simulated structural responses and deriving one or more approximate Pareto Optimal Points (POPs) from said metamodels;

(e) selecting one or more Pareto Optimal Frontier (POF) kernels from said one or more approximate POPs with a first point selection procedure that maximizes minimum distance amongst the selected POF kernels;

(f) establishing one or more subregions encasing the respective POF kernels, each subregion being associated with a size;

(g) creating a set of Diversity Basis Points by populating said subregions according to a space filling criterion;

(h) selecting another set of sampling points from a combined group of the set of Diversity Basis Points and the POF kernels using a second point selection procedure that maximizes minimum distance amongst the currently-selected set of sampling points; and (i) reducing the size of said subregions and repeating (c)-(h), until a termination condition has been reached and the currently-selected set of sampling points represent optimal designs of the product.

12. The non-transitory computer readable storage medium of claim 11, wherein said one or more subregions are overlapped at respective borders.

* * * * *